(12) United States Patent
Gajanan et al.

(10) Patent No.: US 10,021,710 B2
(45) Date of Patent: Jul. 10, 2018

(54) SYSTEM AND METHOD FOR SUPPORTING COEXISTENCE OF MULTIPLE RADIO

(71) Applicant: Samsung Electronics Co., Ltd., Gyeonggi-do (KR)

(72) Inventors: Sushanth Gajanan, Bangalore (IN); Ranjeet Kumar Patro, Bangalore (IN); Thenmozhi Arunan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 14/458,187

(22) Filed: Aug. 12, 2014

(65) Prior Publication Data
US 2015/0043493 A1  Feb. 12, 2015

(30) Foreign Application Priority Data
Aug. 12, 2013  (IN) .......................... 3580/CHE/2013

(51) Int. Cl.
| | |
|---|---|
| *H04W 72/04* | (2009.01) |
| *H04W 4/00* | (2018.01) |
| *H04L 12/28* | (2006.01) |
| *H04W 72/12* | (2009.01) |
| *H04W 16/14* | (2009.01) |
| *H04W 84/12* | (2009.01) |
| *H04W 92/20* | (2009.01) |
| *H04W 88/10* | (2009.01) |

(52) U.S. Cl.
CPC ....... *H04W 72/1215* (2013.01); *H04W 16/14* (2013.01); *H04W 84/12* (2013.01); *H04W 88/10* (2013.01); *H04W 92/20* (2013.01)

(58) Field of Classification Search
CPC ........... H04W 72/1215; H04W 72/082; H04W 16/14; H04W 4/008; H04W 24/00; H04W 84/12; H04W 88/10; H04W 92/20; H04W 28/20; H04W 48/16
USPC ......................................................... 370/329
See application file for complete search history.

(56) References Cited

U.S. PATENT DOCUMENTS

| | | | |
|---|---|---|---|
| 8,081,996 B2 | 12/2011 | Kolavennu et al. | |
| 8,265,563 B2 | 9/2012 | Beninghaus et al. | |
| 2002/0181425 A1* | 12/2002 | Sherman ........... | H04W 74/0808 370/338 |
| 2004/0141490 A1* | 7/2004 | Hong .................... | H04W 74/06 370/345 |
| 2006/0084479 A1* | 4/2006 | Kim ...................... | H04W 24/00 455/566 |
| 2006/0215601 A1* | 9/2006 | Vleugels ............... | H04W 28/26 370/328 |
| 2008/0062878 A1* | 3/2008 | Habetha ................ | H04W 92/02 370/235 |
| 2008/0318630 A1* | 12/2008 | Gil .................... | H04W 72/1215 455/561 |

(Continued)

*Primary Examiner* — Edan Orgad
*Assistant Examiner* — Vanneilian Lalchinthang

(57) ABSTRACT

For a system providing coexistence between a WPAN coordinator and WLAN Access Point (AP), the WPAN coordinator requests WLAN AP for WPAN operation in a selected WLAN channel. The WLAN AP responds with the allocated time limit for which the WPAN operation can be performed. After expiration of the allocated time limit, the WPAN coordinator relinquishes the channel to the WLAN AP. A method addresses the operation of the WPAN system in 2.4 GHz ISM band when a non-overlapping WPAN channel selection is infeasible.

28 Claims, 10 Drawing Sheets

(56) References Cited

U.S. PATENT DOCUMENTS

| | | | |
|---|---|---|---|
| 2009/0135772 A1* | 5/2009 | Kwon | H04W 72/0406 370/329 |
| 2009/0161582 A1* | 6/2009 | Kammer | H04W 28/20 370/254 |
| 2009/0245279 A1* | 10/2009 | Wan | H04W 72/1215 370/468 |
| 2010/0091731 A1* | 4/2010 | Kim | H04W 16/14 370/329 |
| 2010/0284380 A1* | 11/2010 | Banerjee | H04W 16/14 370/338 |
| 2011/0149939 A1 | 6/2011 | Wang et al. | |
| 2014/0044073 A1* | 2/2014 | Kim | H04W 72/0453 370/329 |

* cited by examiner

| Action field value | Meaning |
|---|---|
| 0 | ADDTS Request |
| 1 | ADDTS Response |
| 2 | DELTS |
| 3 | Schedule |
| 4 | ADDTS-ULP Request |
| 5 | ADDTS-ULP Response |
| 6-255 | Reserved |

FIG.10

SYSTEM AND METHOD FOR SUPPORTING COEXISTENCE OF MULTIPLE RADIO

CROSS-REFERENCE TO RELATED APPLICATION AND CLAIM OF PRIORITY

The present application is related to and claims priority under 35 U.S.C. § 119(a) to Indian Application Serial No. 3580/CHE/2013, which was filed in the Indian Intellectual Property Office on Aug. 12, 2013, the entire content of which is hereby incorporated by reference.

TECHNICAL FIELD

The present disclosure relates to communication between two different networks sharing the same frequency spectrum for their network operations and more particularly to collaborative coexistence of WPAN network with WLAN network, in which a WPAN coordinator communicates with WLAN AP for WPAN network operation.

BACKGROUND

Wireless communication between multiple electronic devices has been increasing as the benefits and convenience of wireless communication has become more preferred over wired communication. Wireless Personal Area Network (WPAN) technologies such as Bluetooth, Zigbee™ operate in 2.4 GHz band suffer from Wireless Local Area Network (WLAN) interference due to high transmission power characteristics of WLAN. Based on literature survey, ZigBee™ and WLAN device can experience interference rates of up to 58% when base lining the potential interference faced by ZigBee™. Such a high interference caused by WLAN will severely affect the network performance of Zigbee™ network. Bluetooth employs Adaptive Frequency Hopping (AFH) to mitigate the WLAN interference. In AFH, a Bluetooth channel can be classified as good or bad, so that bad channels are avoided and replaced in the hopping sequence by pseudo-randomly selecting out of the remaining good channels. However, the AFH is not effective if the entire band is subject to interference from the WLAN device.

High power WLAN transmissions can interfere with co-located WPAN networks. To avoid WLAN interference, WPAN networks can operate in a WPAN channel that does not overlap with WLAN network. However, WLAN networks are almost ubiquitous in homes, office buildings, and outdoors in urban areas and one WLAN system occupies 22 MHz of channel bandwidth in the 2.4 GHz band. Hence, non-overlapping channel for a WPAN network cannot be guaranteed.

SUMMARY

The principal object of the embodiments herein is to system and method providing coexistence between a Wireless Personal Area Network (WPAN) and Wireless Local Area Network (WLAN), where the WPAN and WLAN share the same spectrum in an unlicensed band for network operations.

Another object of the disclosure is to provide coexistence of WPAN in Contention Period (CP) and Contention Free Period (CFP) of WLAN.

Another object of the disclosure is to provide new frames for the coordination between a WPAN coordinator and a WLAN Access Point (AP).

To address the above-discussed deficiencies, it is a primary object to provide a system for providing coexistence between a first radio module and a second radio module, wherein the system is configured to select a channel allocated to the first radio module for operation of the second radio module by the second radio module. The system is further configured to request the first radio module for reservation of the channel for operation of the second radio module. Further the system is configured to allocate the channel for operation of the second radio module by the first radio module in response to the request. Furthermore the system is configured to relinquish the channel after completing operation of the second radio module in the channel by the second radio module.

Accordingly the disclosure provides a method for providing coexistence between a first radio module and a second radio module, wherein the method comprises selecting a channel allocated to the first radio module for operation of the second radio module by the second radio module. The method further comprises requesting the first radio module for reservation of the channel to operation of the second radio module. Further the method comprises allocating the channel for operation of the second radio module by the first radio module in response to the request. Furthermore the method comprises relinquishing the channel after completing operation of the second radio module in the channel by the second radio module.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates a table showing updated QoS Action field format, according to embodiments as disclosed herein.

DETAILED DESCRIPTION

Figure 1:
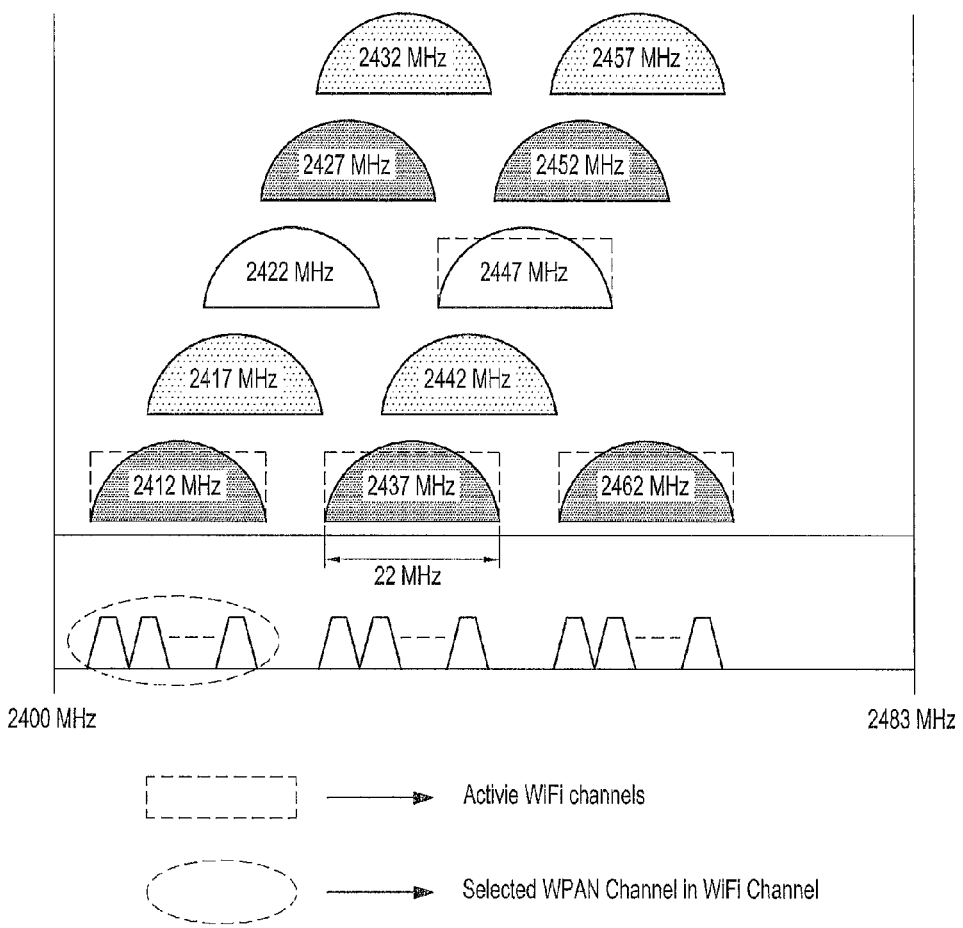
FIG. 1 illustrates an example channel selection for WPAN operation, according to embodiments as disclosed herein.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The labels first and second described herein are used only for illustrative purpose and do not limit the scope of the disclosure, which is defined only by the claims. The terms first and second are generally used, unless otherwise indicated, to illustrate the use of similar or substantially similar components and it is to be understood that other example embodiments are not limited thereto.

The embodiments herein achieve a system and method for collaborative coexistence of first radio network with a second radio network. The second radio network requests the first radio network to use a channel allocated to the first radio network for operation of the second radio network.

In an embodiment, the first radio network can be a Wireless Local Area Network (WLAN) which comprises a first radio module such as a WLAN Access Point (WLAN AP) to which plurality of first radio devices such as WiFi devices are connected.

In an embodiment, the second radio network can be Wireless Personal Area Network (WPAN) which comprises a second radio module such as a WPAN coordinator to which plurality of second radio devices such as WPAN devices are connected.

The proposed method provides coexistence between a WPAN coordinator module (second radio module) and WLAN Access Point (AP) module (first radio module), The WPAN coordinator communicates with the WLAN AP for WPAN operation.

Throughout the description the terms first radio module and WLAN AP are used interchangeably.

Throughout the description the terms second radio module and WPAN coordinator are used interchangeably.

In an embodiment, the WPAN coordinator acts a hub to plurality of WPAN devices. In an embodiment, the WPAN devices can be Bluetooth devices, Zigbee devices, Body Area Network sensors or any other short range communication devices.

In an embodiment, the WLAN AP acts as a hub to plurality of WiFi devices (Stations). In an embodiment, the stations can be a mobile phone, smart phone, Laptop, Tablet, or any other wireless devices having WiFi module.

Referring now to the drawings, and more particularly to FIGS. 1 through 10, where similar reference characters denote corresponding features consistently throughout the figures, there are shown preferred embodiments.

FIG. 1 illustrates an example channel selection for WPAN operation, according to embodiments as disclosed herein.

In an embodiment, the proposed method supports coexistence between a wireless network (such as WPAN) and wireless local area network (WLAN) in an unlicensed band, where the WPAN and WLAN share the same spectrum in the unlicensed band for network operations. Generally, WPAN networks scan the unlicensed band to start the network operation in a WLAN interference free channel. However, due to large bandwidth requirement in WLAN, it is difficult to always guarantee a WLAN interference free channel for WPAN. In such a situation, WPAN and WLAN need to share the same channel resources for their respective operation. To select a channel for network operation allocated to the WLAN AP, WPAN coordinator scans all the channels in the Industrial, Scientific and Medical (ISM) band. WPAN coordinator selects the WLAN interference free channel for WPAN operation. The WPAN coordinator selects a WLAN channel (22 MHz in 2.4 GHz ISM band) with minimum number of WLAN networks for WPAN operation when the WLAN interference free channel is not available in the ISM band. The proposed method is a collaborative method, where the WPAN coordinator and WLAN AP share the same WLAN channel, coordinate the channel access and avoid interference caused by one network to the other network. The figure shows the active WiFi channels and the selected WPAN channels in WiFi channel.

Figure 2:
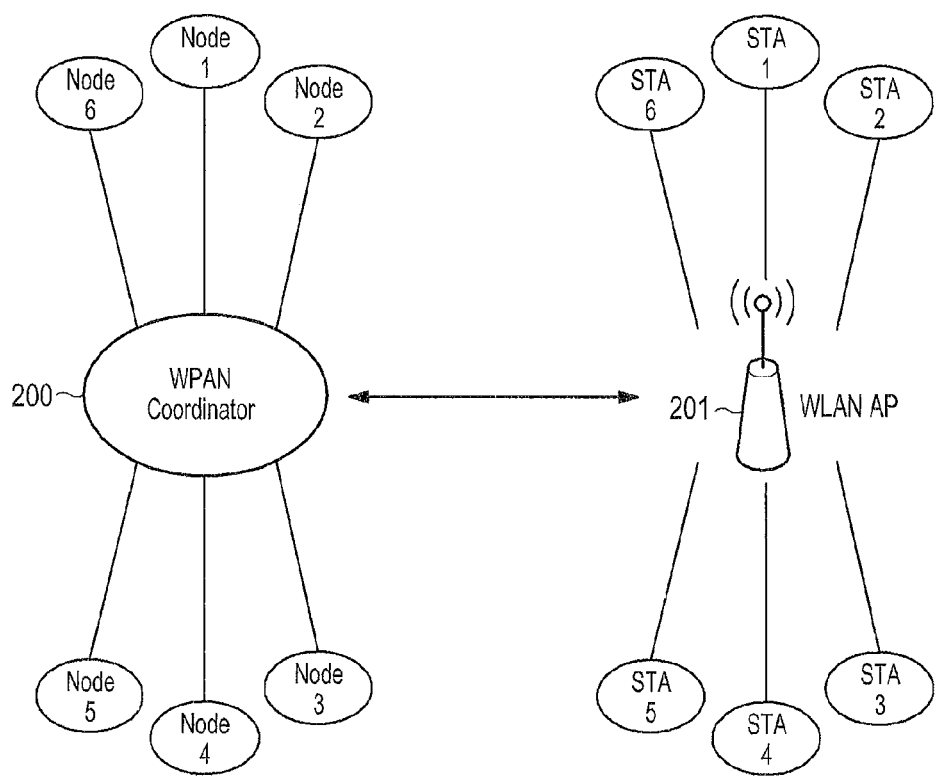
FIG. 2 illustrates a coexistence scenario between a WPAN and WLAN, according to embodiments as disclosed herein.

FIG. 2 illustrates a coexistence scenario between a WPAN and WLAN, according to embodiments as disclosed herein.

The figure depicts the two-way communication between a WPAN coordinator 200 and WLAN AP 201. The WPAN coordinator comprises plurality of nodes (node 1-node 6). In an embodiment, the nodes refer to the WPAN devices connected to the WPAN coordinator 200. For example, the WPAN device can be a Bluetooth device, Zigbee device, Body area network sensors or any other short range communication device. The WLAN AP 201 comprises plurality of stations (STA 1-STA 6). In an embodiment, the stations can be WiFi devices. For example, the station can be a laptop, smart phone, tablet or any other electronic device capable of communicating with WLAN AP. To get the WiFi channel for WPAN operation, the WPAN coordinator 200 sends the request to the WLAN AP 201 for WPAN operation. In response, based on the availability of the channel, the WLAN AP 201 sends the response to the WPAN coordinator. Hence, there is two-way communication between the WPAN coordinator and WLAN AP. Generally, there are two modes in WLAN: Ad-Hoc mode and Infrastructure mode. In the ad-hoc mode, WLAN operates in the contention mode exclusively, requiring each WLAN node to contend to access the channel for each frame transmitted. In the infrastructure mode, WLAN alternates between contention period (CP) and contention free period (CFP). During the CFP, the WLAN AP can control the access to the medium, thereby eliminating the need for contention during the CFP.

Proposed method addresses the coexistence of a WPAN and a WLAN with both operating in the infrastructure mode.

Figure 3:
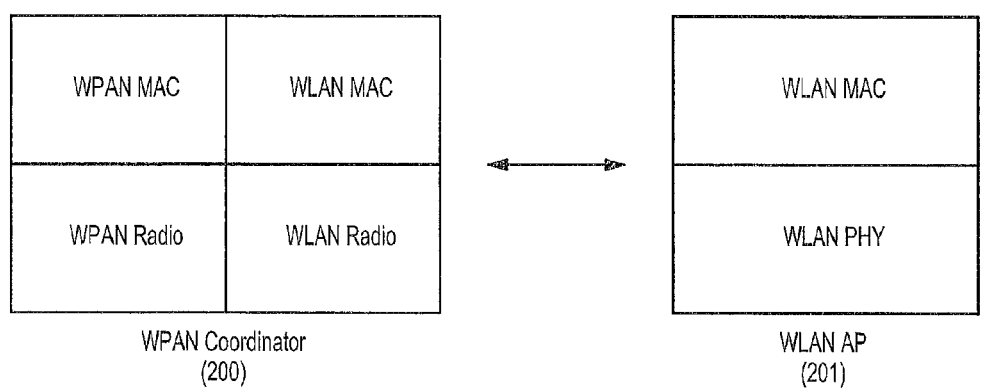
FIG. 3 illustrates a WPAN and a WLAN radio architecture, according to embodiments as disclosed herein.

FIG. 3 illustrates a WPAN and a WLAN radio architectures, according to embodiments as disclosed herein.

In order to enable WPAN operation in WiFi channel, the WPAN coordinator 200 comprises both WPAN radio and WLAN radio. There is a dual radio in the WPAN coordinator 200. The WPAN radio helps to exchange frames with WPAN devices and WLAN radio helps to exchange frames with the WLAN AP 201.

Figure 4:
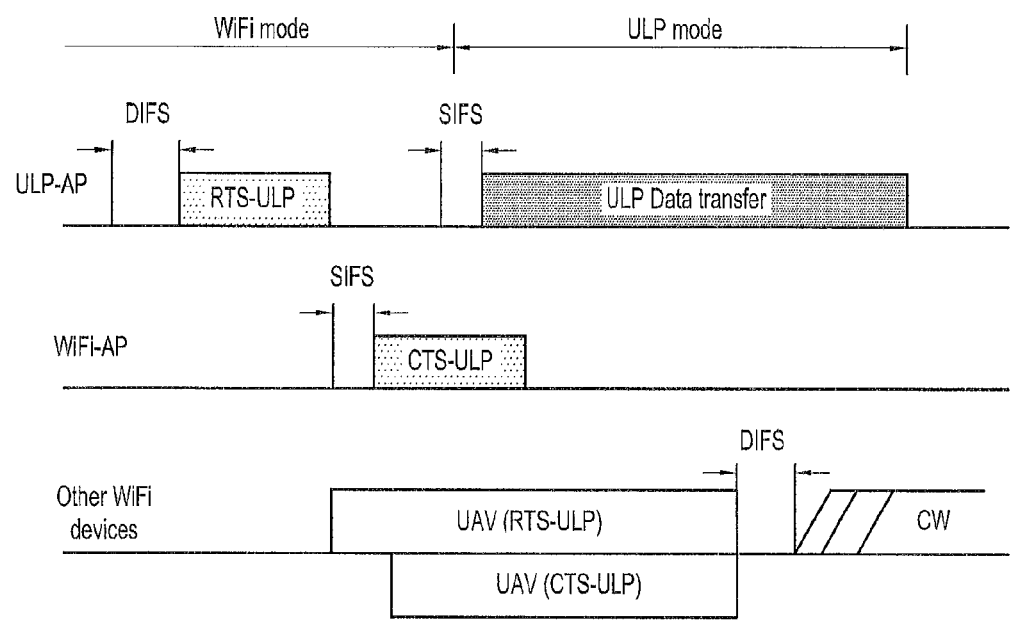
FIG. 4 illustrates a timing diagram showing coexistence between a WPAN Coordinator and a WLAN AP in contention period, according to embodiments as disclosed herein.

FIG. 4 illustrates a timing diagram showing coexistence between a WPAN Coordinator and a WLAN AP in contention period, according to embodiments as disclosed herein.

After selection of an appropriate WLAN channel for WPAN operation, the WPAN coordinator 200 collaborates with WLAN AP 201 for WPAN operation as described below. The WPAN coordinator 200 has two modes: a WPAN mode and a WLAN mode (Ultra Low Power (ULP) mode). Whenever WPAN coordinator 200 wants to have a data session with its sensor devices, WPAN coordinator switches to WLAN mode and joins the WLAN network as the station (STA) or the WLAN device. After joining the WLAN network, WPAN coordinator 200 waits for beacon frame transmitted by WLAN STA and locates the contention period. In the contention access period, WPAN coordinator 200 access the channel following the contention access procedure defined in the IEEE 802.11 specification. After getting access to the channel, the WPAN coordinator 200 transmits a Request to Send-Ultra Low Power (RTS-ULP) frame to the WLAN AP 201 and waits for a Clear to Send-Ultra Low Power (CTS-ULP) frame from the WLAN AP 201. Upon receiving the RTS-ULP frame, WLAN AP 201 waits for a Short Inter-Frame Space (SIFS) and responds with a CTS-ULP frame. Then the WLAN AP 201 allows the commencement of WPAN operation in the occupied WLAN channel. RTS-ULP frame and CTS-ULP frames contain a field with ULP allocation vector (UAV), wherein UAV specifies the duration of ULP operation (ULP data transfer) in the WLAN channel as requested by the WPAN coordinator 200.

The WLAN devices that receive RTS-ULP frame and CTS-ULP frame set their UAV counter and defer access to the channel for the UAV duration.

After receiving a CTS-ULP frame, the WPAN coordinator 200 switches to the WPAN radio mode and begins WPAN operation with its sensor device. For example, the sensor device can be a Bluetooth device, and on receiving the CTS-ULP frame the Bluetooth transmission or reception can start in the WiFi channel allocated by the WiFi AP 201.

When the UAV duration expires, WPAN coordinator 200 releases the WLAN channel for WLAN operation. The WPAN coordinator 200 switches back to WLAN radio mode when it wants to have a WPAN session again and repeats the above mentioned procedure.

Figure 5:
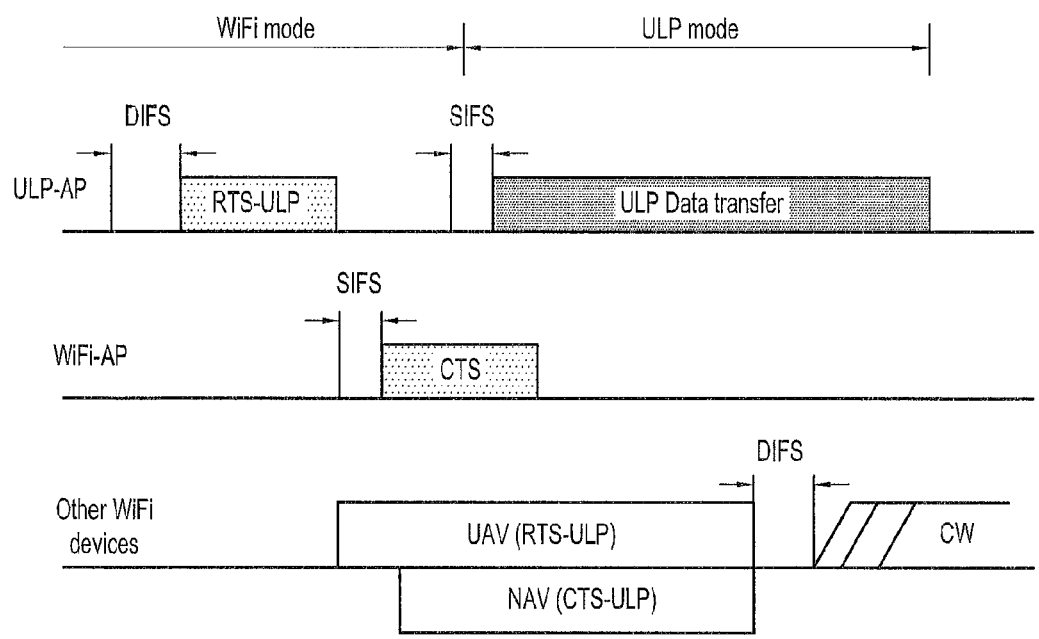
FIG. 5 illustrates a timing diagram showing coexistence between a WPAN and a WLAN in contention period, when WLAN AP is in the mixed mode, according to embodiments as disclosed herein.

FIG. 5 illustrates a timing diagram showing coexistence between a WPAN and a WLAN in contention period, when WLAN AP is in the mixed mode, according to embodiments as disclosed herein.

In an embodiment, the mixed mode includes RTS-ULP and CTS-ULP frames. In the mixed mode operation, the WLAN AP 201 is associated with new WLAN devices (which support proposed new frames RTS-ULP and CTS-ULP) as well as legacy WLAN devices in a Base Service Set (BSS) for coexistence between these new devices and legacy devices which do not support proposed new frames RTS-ULP and CTS-ULP. After locating the beacon frame and contention period from WLAN AP 201, the WPAN coordinator 200 transmits a RTS-ULP frame to the WLAN AP 201. Upon receiving the RTS-ULP frame from WPAN coordinator 200, WLAN AP 201 sends a CTS frame to the WPAN coordinator 200. Note that RTS-ULP frame contains a UAV duration as requested by the WPAN coordinator 200 and the CTS NAV duration is limited by 2 octet duration field values. Whenever the UAV duration is greater than the maximum NAV duration, WLAN AP 201 sets the maximum NAV duration in the CTS frame when responding to the RTS-ULP frame. WLAN devices in the mixed mode defer the access to the channel for the NAV duration. WPAN coordinator 200 commences the WPAN operation in the set NAV duration and relinquishes or releases channel after expiration of the NAV duration, Further, the WPAN coordinator 200 switches back to the WLAN radio mode when it wants to have a WPAN session again and repeats the procedure.

Figure 6:
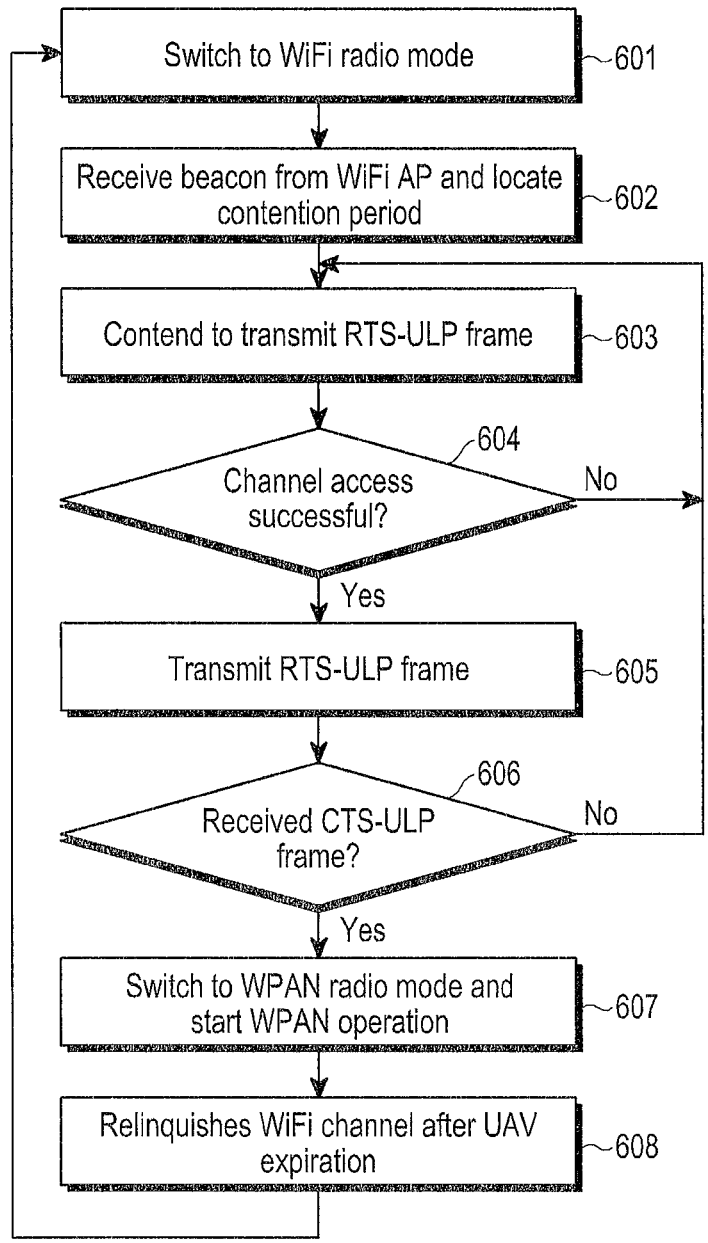
FIG. 6 illustrates a flow diagram explaining coexistence of a WPAN coordinator and a WLAN AP in the contention access period of WLAN Superframe, according to embodiments as disclosed herein.

FIG. 6 illustrates a flow diagram explaining coexistence of a WPAN coordinator and a WLAN AP in the contention access period of WLAN Superframe, according to embodiments as disclosed herein.

In the flow diagram, a WLAN AP is referred as a WiFi AP. Initially, the WPAN coordinator 200 switches to a WiFi radio mode in step 601. The WPAN coordinator 200 receives the beacon from a WiFi AP and locate a contention period in step 602. After receiving the beacon from the WiFi AP, the WPAN coordinator 200 contends with WiFi AP to transmit a RTS-ULP frame in step 603. Further, the WPAN coordinator 200 determines whether the channel access of WiFi AP is successful in step 604. If the channel access it not successful, then the WPAN coordinator 200 again contends to transmit the RTS-ULP frame as described in step 603. If the channel access is successful, then the WPAN coordinator 200 directly transmits the RTS-ULP frame to the WiFi AP 201 in step 605. The WPAN coordinator 200 waits for the SIFS period and checks whether the CTS-ULP frame from the WiFi AP 201 is received or not in step 606. If the WPAN coordinator 200 does not receive the CTS-ULP frame from the WiFi AP 201, then the WPAN coordinator again contends to transmit RTS-ULP frame as described in step 603. If the WPAN coordinator 200 receives the CTS-ULP frame from the WiFi AP 201, then the WPAN coordinator switches to WPAN radio mode and start WPAN operation in step 607. For example, the WPAN operation can be any Bluetooth transmission which can be performed on the WiFi channel. Both the RTS-ULP and CTS-ULP frame includes the UAV specifying the duration of ULP operation. The WPAN coordinator 200 receives the UAV along with the CTS-ULP frame from the WiFi AP 201. After the expiration of the UAV, the WPAN coordinator 200 relinquishes a WiFi channel and moves to the WPAN mode in step 608. In an embodiment, the WPAN coordinator 200 whenever wants to perform the WPAN operation can repeat from step 601 to step 608. The various actions in flow diagram 600 can be performed in the order presented, in a different order or simultaneously. Further, in some embodiments, some actions listed in FIG. 6 can be omitted.

Figure 7:
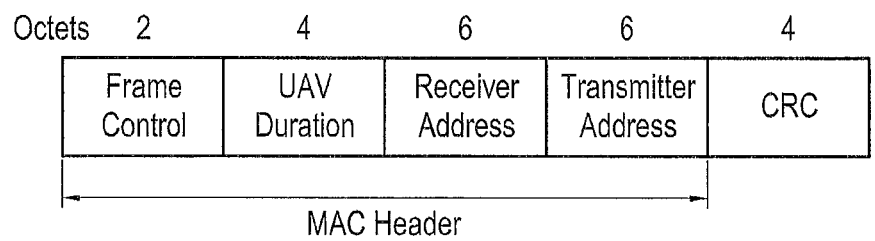
FIG. 7 illustrates a RTS-ULP frame format, according to embodiments as disclosed herein.

FIG. 7 illustrates a RTS-ULP frame format, according to embodiments as disclosed herein.

In a RTS-ULP frame, Receiver Address (RA) is the address of the WLAN AP 201, Transmitter Address (TA) is the address of the WPAN coordinator 200. The UAV duration in the RTS-ULP frame is the time in microseconds required to carry out a WPAN session, plus transmission time of one CTS frame, plus two SIFS intervals.

Figure 8:
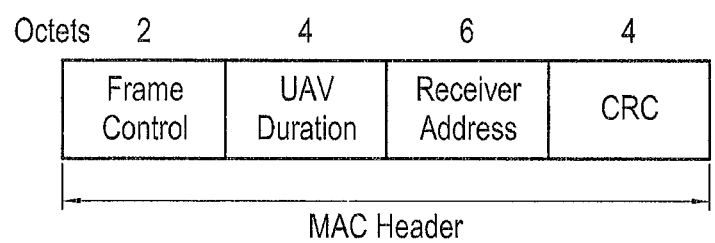
FIG. 8 illustrates a CTS-ULP frame format, according to embodiments as disclosed herein.

FIG. 8 illustrates a CTS-ULP frame format, according to embodiments as disclosed herein.

In a CTS-ULP frame, RA field is copied from the TA field of the immediately received RTS-ULP frame to which CTS-ULP is a response. The UAV duration valued in the CTS-ULP frame is in microseconds, required to carry out a WPAN session by WPAN coordinator 200, plus one SIFS interval. In frame control field, for RTS-ULP control frame, the type field value is 01 and the subtype field value is 0110 and for CTS-ULP control frame the type field value is 01 and the subtype field value is 0111.

WLAN devices compliant to the proposed method will possess mechanism to encode and process the proposed frames. However, legacy WLAN devices are not equipped to process such type of frames and will discard the RTS-ULP and CTS-ULP frames.

In an embodiment, the method provides coexistence between WPAN coordinator 200 and WLAN AP 201, when WLAN AP 201 operates in a mixed mode. In a mixed mode operation, WLAN AP 201 is associated with new WLAN devices as well as legacy WLAN devices in a BSS.

Figure 9:
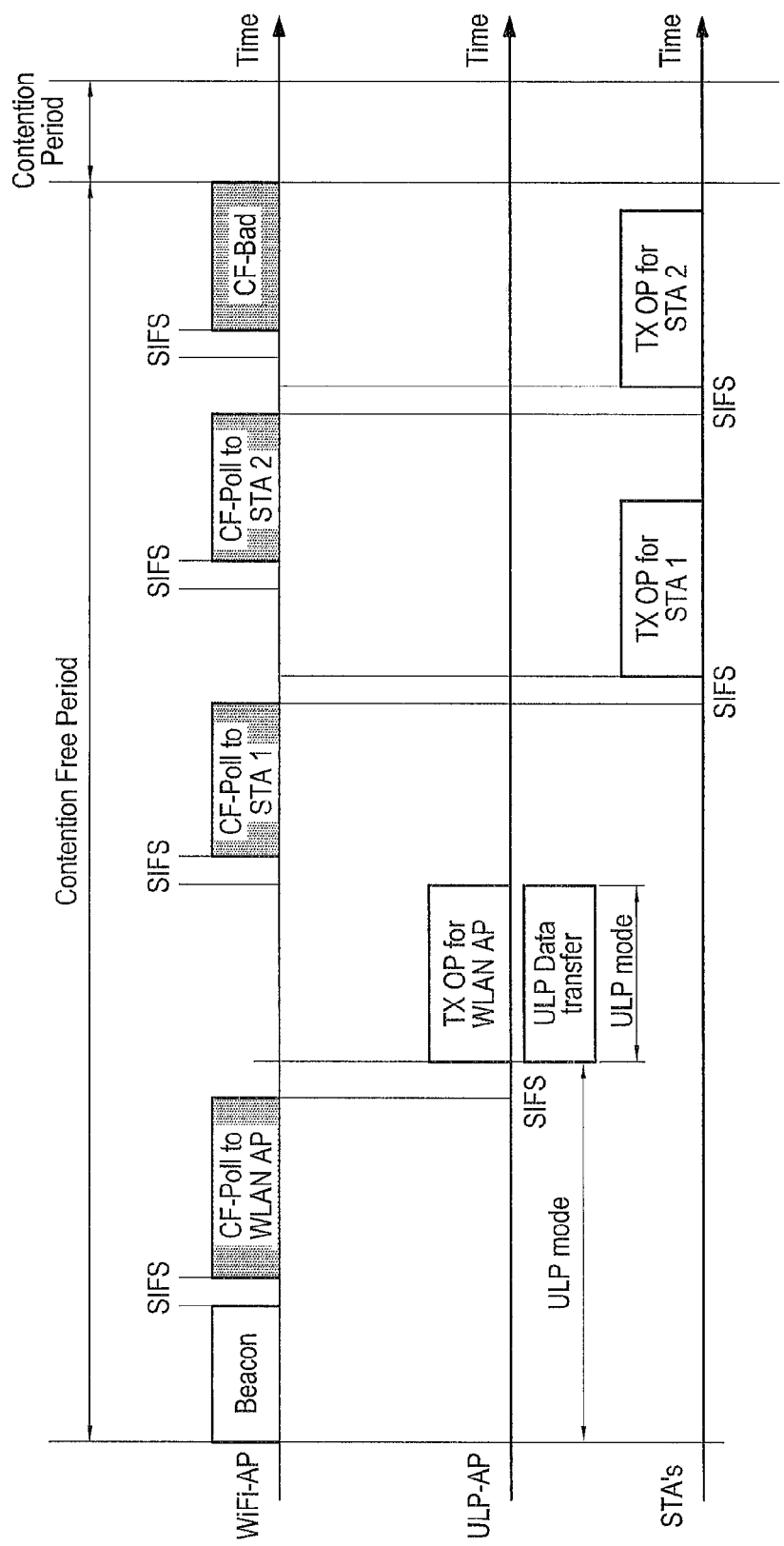
FIG. 9 illustrates a timing diagram showing coordination between a WPAN coordinator and a WLAN AP in the contention free period of WLAN AP, according to embodiments as disclosed herein.

FIG. 9 illustrates a timing diagram showing coordination between a WPAN coordinator and a WLAN AP in the contention free period of WLAN AP, according to embodiments as disclosed herein.

The WPAN coordinator 200 switches to the WLAN mode and gets associated with the BSS of WLAN AP 201. The WPAN coordinator 200 sends an Association Request frame to the WLAN AP 201. After the WLAN AP 201 receives the association request successfully, it responds with an Association Response frame back to the WPAN coordinator. After getting associated with WLAN AP, WPAN coordinator sends ADDTS-ULP Request command with a defined Traffic Specification (TSPEC). The TSPEC is derived from the QoS requirements and traffic characteristics of a WPAN session as decided by the WPAN coordinator 200. The WLAN AP transmits ADD Traffic Stream-Ultra Low Power (ADDTS-ULP) Response command in response to the ADDTS-ULP Request command. The WPAN coordinator 200 waits for the beacon frame transmitted by WLAN AP 201 and locates the contention free period. In the contention free period, WPAN coordinator 200 waits for CF-POLL frame from the WLAN AP 201. The CF-POLL frame from the WLAN AP 201 contains the value of Transmit Opportunity (TXOP) allocated to the WPAN coordinator 200. The TXOP is allocated to WPAN coordinator 200 based on TSPEC value communicated by WPAN coordinator 200 in the ADD Traffic Stream-Ultra Low Power (ADDTS-ULP) Request frame. After receiving the CF-POLL frame from the WLAN AP 201, the WPAN coordinator 200 switches to WPAN radio mode and carries out WPAN data session. The WPAN coordinator 200 relinquishes the WLAN channel after the allocated TXOP limit. Whenever the WPAN coordinator 200 wants to have a WPAN session, the WPAN coordinator 200 switches back to WLAN mode and waits for the beacon frame from WLAN AP 201 and waits for its turn in the next CFP.

FIG. 10 illustrates a table showing updated QoS Action field format, according to embodiments as disclosed herein.

Two new frames, ADDTS-ULP request and ADDTS-ULP response frames are created under the Quality of Service (QoS) Action frame category for coexistence between WPAN network and WLAN network. The ADDTS-ULP Request frame is a new QoS Action frame under management frame category defined for the admission of WPAN coordinator 200 to the WLAN AP's 201 polling list. The ADDTS-ULP Response frame is a new QoS Action frame under management frame category defined for the response of WLAN AP 201 to the WPAN coordinator's 200 request.

The embodiments disclosed herein can be implemented through at least one software program running on at least one hardware device and performing network management functions to control the elements. The elements shown in FIGS. 2 and 3 include blocks which can be at least one of a hardware device, or a combination of hardware device and software module.

In certain embodiments, the subscriber station and the base station described in U.S. Patent Publication No. 20100172290 can be used for the embodiments of the present disclosure, the disclosure of which is incorporated by reference in its entirety.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A second radio module for supporting coexistence between a first radio module and the second radio module, comprising:
 a transceiver configured to transmit and receive at least one signal;
 a controller configured to:
  select a channel allocated to the first radio module for an operation of the second radio module based on a minimum number of first radio devices connected to the first radio module;
  control to transmit a request for an allocation of the selected channel to the first radio module;
  control to receive a response including the allocation of the selected channel from the first radio module; and
  release the allocated channel after completing the operation of the second radio module in the allocated channel, wherein, in a contention period (CP) of a superframe provided by the first radio module the request includes a first time duration during which the second radio module uses the selected channel, and the response includes a second time duration for allocating the selected channel to the second radio module, wherein, in a contention free period (CFP) of a superframe provided by the first radio module, the request includes traffic characteristic of a session associated with the second radio module, the controller further configured to control to receive information associated with a transmit opportunity allocated to the second radio module, and the information associated with a transmit opportunity is based on the traffic characteristic.

2. The second radio module of claim 1, wherein the first radio module is a wireless local area network access point (WLAN AP) and the second radio module is a wireless personal access network (WPAN) coordinator, which comprises a WPAN radio transceiver and WLAN radio transceiver.

3. The second radio module of claim 2, wherein the controller performs a transmission of a packet using at least one second radio device in the channel.

4. The second radio module of claim 1, wherein the controller is configured to transmit the request in one of the CP and the CFP of a superframe provided by the first radio module.

5. The second radio module of claim 4, wherein the controller is configured to transmit a Request to Send-Ultra Low Power (RTS-ULP) frame during the CP to the first radio module.

6. The second radio module of claim 5, wherein the RTS-ULP comprises a ULP allocation vector (UAV) field to indicate a channel duration for the operation of the second radio module.

7. The second radio module of claim 5, wherein the controller is configured to receive a Clear to Send-Ultra Low Power (CTS-ULP) frame in response to the RTS-ULP frame during the CP of the superframe.

8. The second radio module of claim 7, wherein the CTS-ULP comprises a ULP allocation vector (UAV) field to indicate a granted channel allocation duration for the operation of the second radio module during the CP.

9. The second radio module of claim 4, wherein the controller is configured to transmit an ADD traffic streams-ULP (ADDTS-ULP) request frame for the channel allocation during the CFP of the superframe provided by the first radio module, wherein an ADD-TS request frame comprises a traffic specification (TSPEC).

10. The second radio module of claim 9, wherein the controller is configured to receive the response including the allocation of the selected channel from the first radio module by receiving an ADD traffic streams-ULP(ADDTS-ULP) response frame from the first radio module in response to the ADDTS-ULP request during the CFP.

11. The second radio module of claim 4, wherein the controller is configured to wait for a beacon frame from the first radio module after successful channel allocation, locates the CFP and waits for a CF-Poll frame from the first radio module.

12. The second radio module of claim 11, wherein the controller is configured to receive the CF-Poll frame from a WLAN AP with a transmit opportunity (TXOP) value allocated to the second radio module indicating a duration for a granted operation of the second radio module.

13. The second radio module of claim 3, wherein the controller is configured to allow the at least one second radio device to perform a transmission of a packet in the channel during one of a contention period (CP) and a contention free period (CFP).

14. A method for supporting coexistence between a first radio module and a second radio module, wherein the method comprises:
selecting, by the second radio module, a channel allocated to the first radio module for an operation of the second radio module based on a minimum number of first radio devices connected to the first radio module;
transmitting, by the second radio module, a request for an allocation of the selected channel to the first radio module;
receiving, by the second radio module, a response including the allocation of the selected channel from the first radio module; and
releasing, by the second radio module, the allocated channel after completing the operation of the second radio module in the allocated channel,
wherein, in a contention period (CP) of a superframe provided by the first radio module, the request includes a first time duration during which the second radio module uses the selected channel, and the response includes a second time duration for allocating the selected channel to the second radio module,
wherein, in a contention free period (CFP) of a superframe provided by the first radio module, the request includes traffic characteristic of a session associated with the second radio module information associated with a transmit opportunity allocated to the second radio module is further received, and the information associated with a transmit opportunity is based on the traffic characteristic.

15. The method of claim 14, wherein the first radio module is a wireless local area network access point (WLAN AP) and the second radio module is a wireless personal access network (WPAN) coordinator which comprises a WPAN radio and a WLAN radio.

16. The method of claim 14, wherein the second radio module performs a transmission of a packet using the second radio device in the channel.

17. The method of claim 15, wherein transmitting comprises transmitting the request in one of the CP and the CFP of the superframe provided by the first radio module.

18. The method of claim 17, further comprising: transmitting a Request to Send-Ultra Low Power (RTS-ULP) frame during the CP to the first radio module.

19. The method of claim 18, wherein the RTS-ULP comprises a ULP allocation vector (UAV) field to indicate a channel duration for the operation of the second radio module.

20. The method of claim 18, wherein receiving comprises receiving the response including the allocation of the selected channel from the first radio module by receiving a Clear to Send-Ultra Low Power (CTS-ULP) frame in response to the RTS-ULP frame during the CP of the superframe.

21. The method of claim 20, wherein the CTS-ULP comprises a ULP allocation vector (UAV) field to indicate a granted channel allocation duration for the operation of the second radio module during the CP.

22. The method of claim 18, further comprising:
transmitting an ADD traffic streams-ULP (ADDTS-ULP) request frame for the channel allocation during the CFP of the superframe provided by the first radio module, wherein an ADD-TS request frame comprises a traffic specification (TSPEC).

23. The method of claim 22, wherein receiving comprises receiving the response including the allocation of the selected channel from the first radio module by receiving an ADDTS-ULP response frame from the first radio module in response to the ADDTS-ULP request during the CFP.

24. The method of claim 17, further comprises:
waiting for a beacon frame from the first radio module after a successful channel allocation;
locating the CFP; and
waiting for a CF-Poll frame from the first radio module.

25. The method of claim 24, further comprising:
receiving the CF-Poll frame from the WLAN AP with a transmit opportunity (TXOP) value allocated to the second radio module indicating a duration for a granted operation of the second radio module.

26. The method of claim 16, further comprising:
allowing the second radio device to perform a transmission of a packet in the selected channel during one of a contention period (CP) and a contention free period (CFP).

27. A first radio module for supporting coexistence between a first radio module and a second radio module, comprising:
a transceiver configured to transmit and receive at least one signal;
a controller configured to receive a request for an allocation of a channel allocated to the first radio module from the second radio module, to transmit a response including the requested allocation of the channel to the second radio module, and
wherein the second radio module selects the channel for an operation of the second radio module based on a minimum number of first radio devices connected to the first radio module, releases the allocated channel after completing the operation of the second radio module in the allocated channel, wherein, in a contention period (CP) of a superframe provided by the first radio module, the request includes a first time duration during which the second radio module uses the selected channel, and the response includes a second time duration for allocating the selected channel to the second radio module, and wherein, in a contention free period (CFP) of a superframe provided by the first radio module, the request includes traffic characteristic of a session associated with the second radio module, the second radio module further receives information associated with a transmit opportunity allocated to the second radio module, and the information associated with a transmit opportunity is based on the traffic characteristic.

28. A method for supporting coexistence between a first radio module and a second radio module, wherein the method comprises:
receiving, by the first radio module, a request for an allocation of a channel allocated to the first radio module from the second radio module; and
transmitting, by the first radio module, a response including the allocation of the requested channel to the second radio module,
wherein the second radio module selects the channel for an operation of the second radio module based on a minimum number of first radio devices connected to the first radio module, and releases the allocated channel after completing the operation of the second radio module in the allocated channel, wherein, in a contention period (CP) of a superframe provided by the first radio module, the request includes a first time duration during which the second radio module uses the selected channel, and the response includes a second time duration for allocating the selected channel to the second radio module, and wherein, in a contention free period (CFP) of a superframe provided by the first radio module, the request includes traffic characteristic of a session associated with the second radio module, the second radio module further receives information associated with a transmit opportunity allocated to the second radio module, and the information associated with a transmit opportunity is based on the traffic characteristic.

* * * * *